United States Patent [19]
Townsend

[11] Patent Number: 5,538,283
[45] Date of Patent: Jul. 23, 1996

[54] AUTOMOBILE ARMREST APPARATUS FOR PRESENTING RESTAINT SYSTEM

[75] Inventor: John A. Townsend, Troy, Mich.

[73] Assignee: Joalto Design, Inc., Southfield, Mich.

[21] Appl. No.: 477,200

[22] Filed: Jun. 7, 1995

Related U.S. Application Data

[63] Continuation-in-part of Ser. No. 342,439, Nov. 18, 1994, Pat. No. 5,505,491, which is a continuation of Ser. No. 230,622, Apr. 21, 1994, Pat. No. 5,393,097, which is a continuation-in-part of Ser. No. 912,790, Jul. 13, 1992, Pat. No. 5,378,036.

[51] Int. Cl.⁶ ............................................. B60R 22/00
[52] U.S. Cl. ...................... 286/801.1; 280/808; 297/481
[58] Field of Search ...................... 280/801.10, 808, 280/907; 297/481, 409, 473, 483, 411, 417

[56] References Cited

U.S. PATENT DOCUMENTS

| | | | |
|---|---|---|---|
| 3,623,768 | 11/1971 | Capener | 297/390 |
| 3,833,257 | 9/1974 | Dove | 297/284 |
| 4,179,086 | 12/1979 | Yamada | 244/122 AG |
| 4,432,566 | 2/1984 | Andres et al. | 280/807 |
| 4,480,713 | 11/1984 | Macht et al. | 180/268 |
| 4,629,214 | 10/1986 | Fohl | 280/808 |
| 4,681,345 | 7/1987 | Swartout | 280/801 |
| 4,725,076 | 2/1988 | Taylor | 280/808 |
| 4,940,282 | 7/1990 | Townsend | 296/155 X |
| 5,072,966 | 12/1991 | Nishitake et al. | 280/730 |
| 5,261,696 | 11/1993 | Hamue | 280/808 |
| 5,263,741 | 11/1993 | Seros et al. | 280/808 |

FOREIGN PATENT DOCUMENTS

| | | |
|---|---|---|
| 3-273959 | 5/1991 | Japan. |
| 4-46836 | of 1992 | Japan. |

*Primary Examiner*—Christopher P. Ellis
*Attorney, Agent, or Firm*—Limbach & Limbach

[57] ABSTRACT

A pivotable armrest is disclosed for presenting a seat belt buckle to a vehicle's occupant when the armrest is extended from a retracted position to a working position. The armrest preferably retracts into an upright position along side of the seat back, but alternatively can be made to downwardly retract adjacent to the seat bottom. The armrest movement may be manually or automatically driven. The armrest is preferably attached to the outboard side of a seat, and is used in conjunction with a conventional shoulder and lap belt arrangement. Preferably, the conventional restraint system is integrally mounted within the seat.

13 Claims, 14 Drawing Sheets

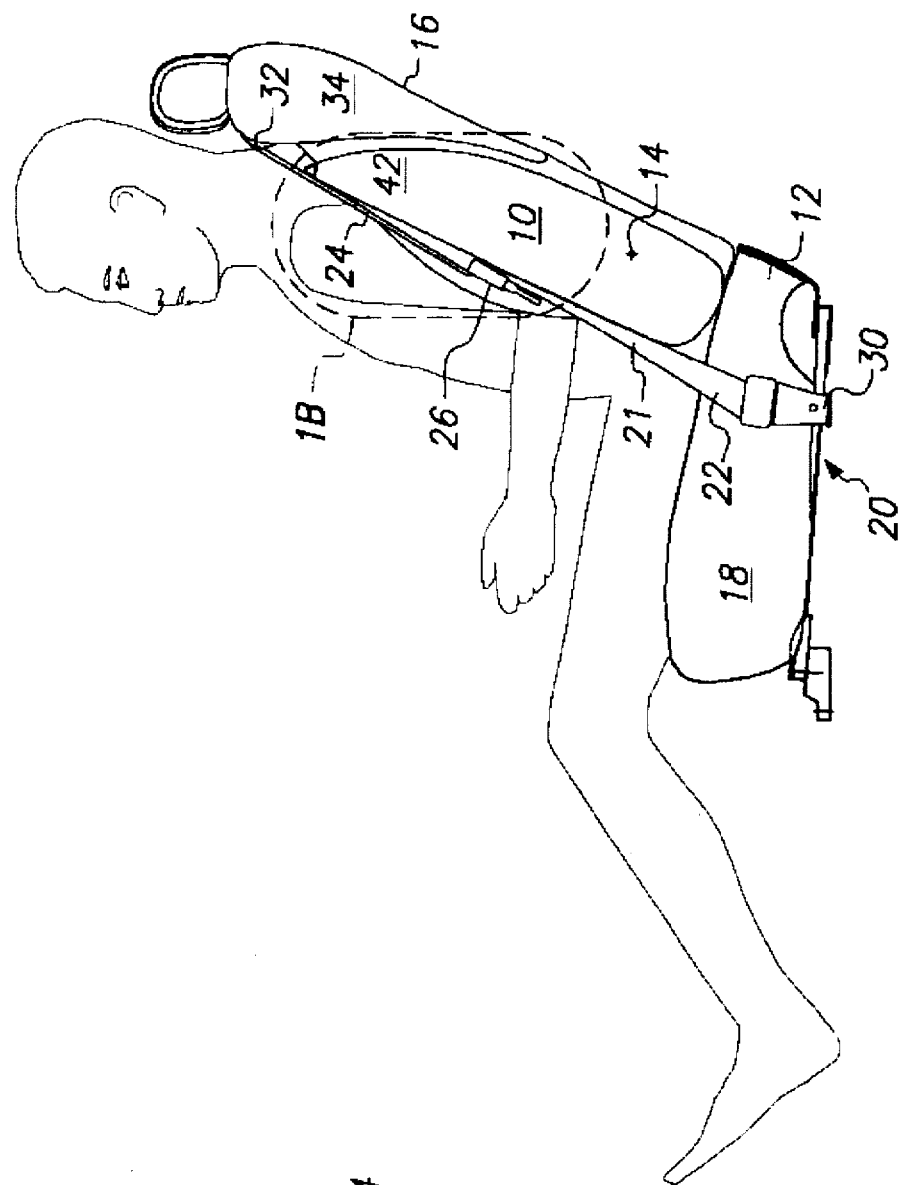
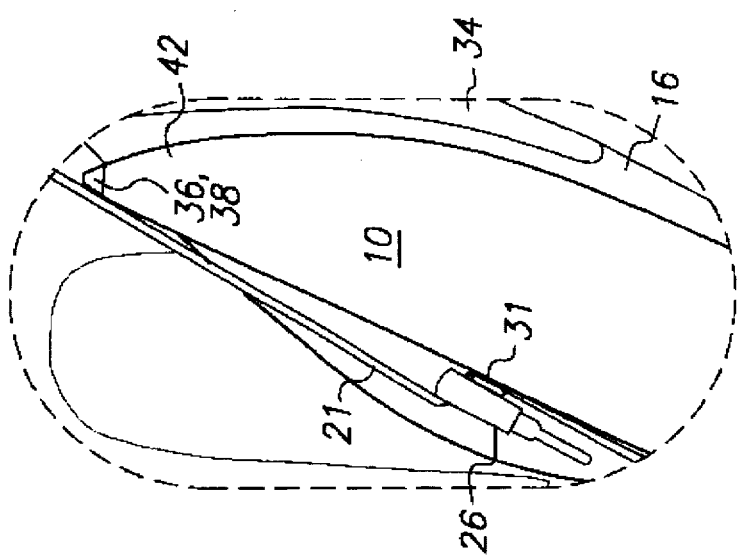
FIG. 1A
FIG. 1B

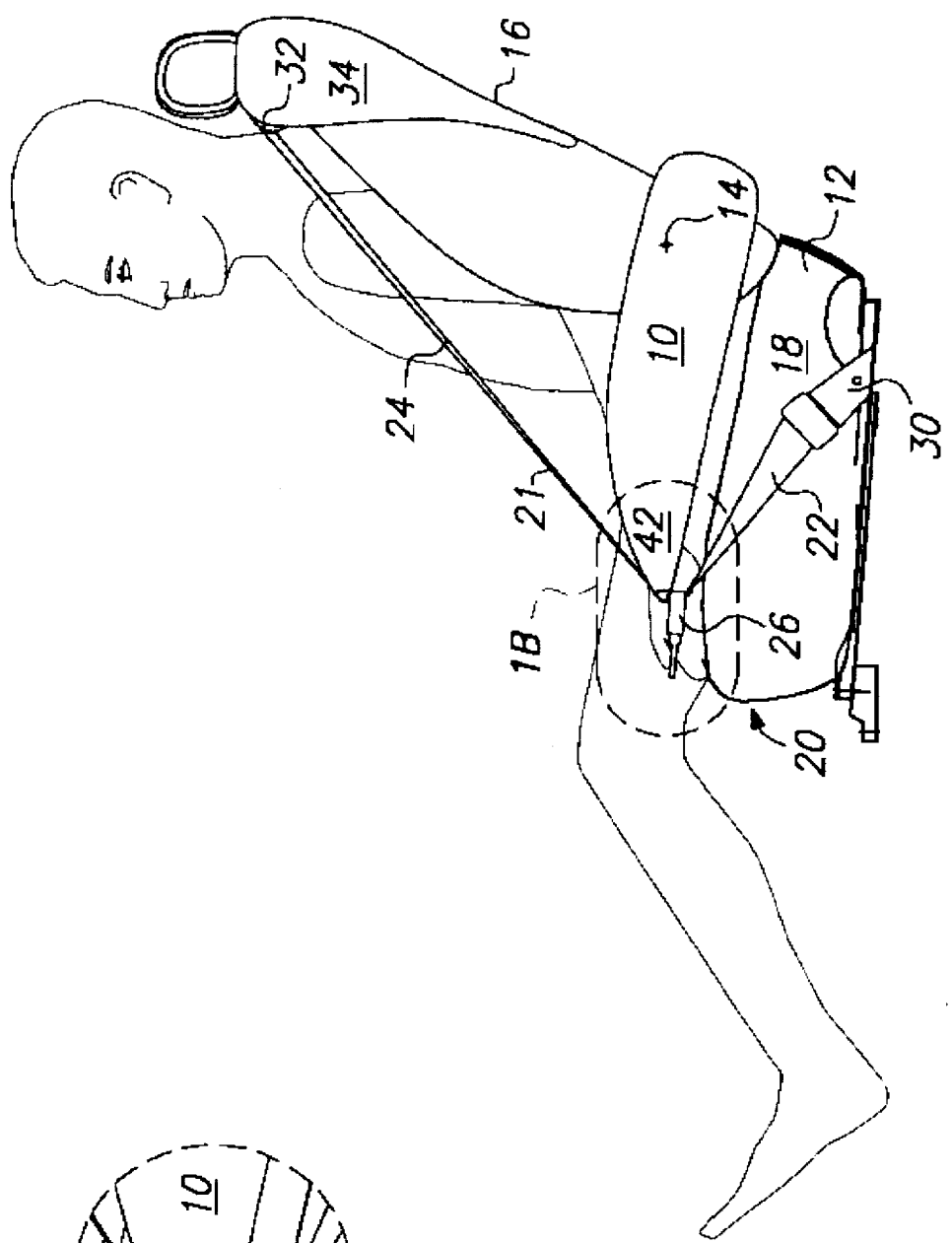
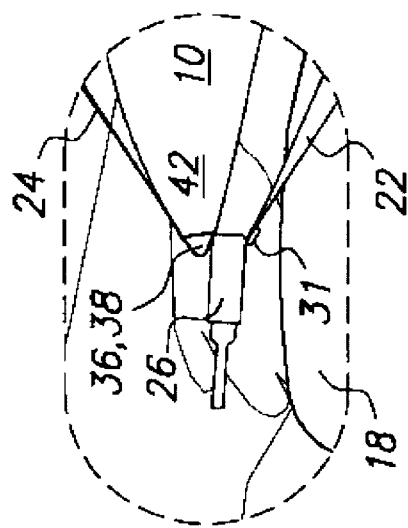
FIG. 2A
FIG. 2B

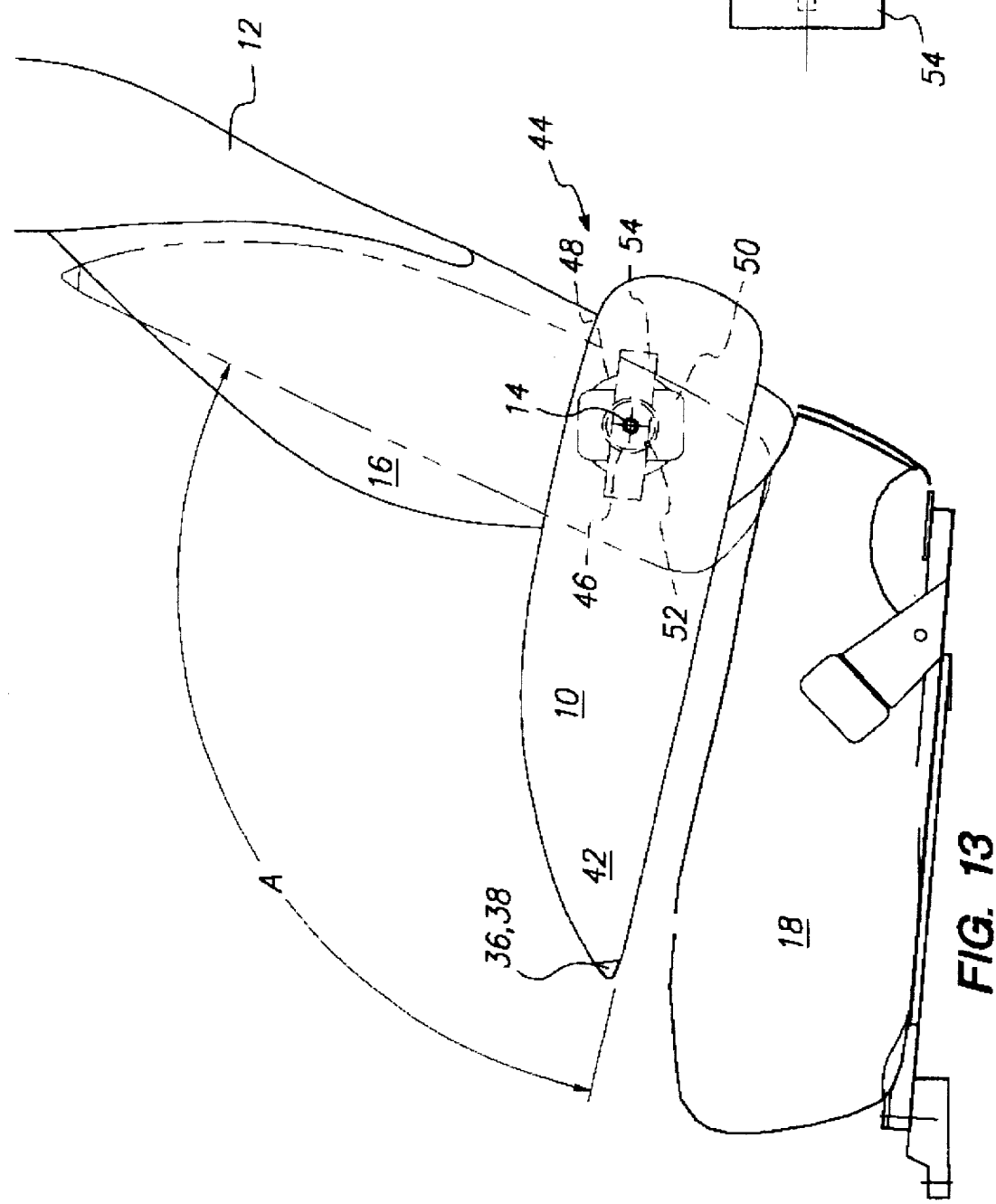

5,538,283

AUTOMOBILE ARMREST APPARATUS FOR PRESENTING RESTAINT SYSTEM

This is a continuation-in-part of application Ser. No. 08/342,439, filed Nov. 18, 1994, U.S. Pat. No. 5,505,491, which is a continuation of application Ser. No. 08/230,622, filed Apr. 21, 1994, U.S. Pat. No. 5,393,097, which is a continuation-in-part of application Ser. No. 07/912,790, filed Jul. 13, 1992, U.S. Pat. No. 5,378,036.

BACKGROUND OF THE INVENTION

1. Field of the Invention

The present invention relates to restraint systems in vehicles, and in particular to presenting a restraint belt to a vehicle occupant.

2. Discussion of the Prior Art

Even with the advent of inflatable air bag restraint systems, the use of restraint belts, in conjunction with or without air bags, is still required for adequate protection of vehicle occupants during collisions or accidents. The conventional restraint belt has evolved into a combination lap belt and diagonal shoulder belt arrangement, with one continuous belt often being used for both. Both lap belt and shoulder belt protection should be used, even when the vehicle is equipped with air bags and or separate shoulder and lap belts.

In a typical single belt arrangement, one end of the belt is anchored to a structural floor member just behind a seat on the outboard side. When in use, the belt extends upward and forward around the occupant's waist and through a belt buckle. The buckle is releasably secured in a receptacle located adjacent the inboard side of the occupant's waist. Some automobiles do not use a buckle and receptacle arrangement, but secure the belt directly through a latch. In any case, the belt is slidably attached on the inboard side, and extends upward diagonally across the occupant's chest and over his or her outboard shoulder to an anchor point above and behind the occupant on the outboard side. A belt retracting mechanism is usually mounted on or in the 'B' pillar rearward of the front door to take up slack in the belt. In some vehicles the retracting mechanism is mounted on the outboard edge of the ceiling or floor, or in the seat back. When force is exerted on the belt in an accident, the retracting mechanism and the slidable adjustment on in inboard side lock to allow the lap and shoulder portions of the belt to function properly.

When the belt is released from the inboard side, the retracting mechanism draws the belt and buckle towards the outboard side of the vehicle. When not in use, the belt extends from the floor anchor point to the upper anchor point or retracting mechanism. The belt buckle typically hangs on the belt around shoulder or head height of the seated occupant.

Instead of having one continuous belt, some restraint systems employ separate lap and shoulder belts attached to a single buckle. These systems use separate retracting mechanisms for the lap and shoulder belts, but otherwise operate in much the same way as single belt systems. The belt buckle hangs behind the outboard side of the occupant when not in use.

To fasten the seat belt, the occupant typically must first twist around in the seat, look over his or her outboard shoulder, and reach around with his or her inboard hand to grab the belt buckle which is above and behind the seat. This is a difficult movement for the occupant to make. Just turning around far enough to see the seat belt can be awkward, with reaching the belt and drawing it around being even more cumbersome. Because of seat belt geometry and door and window constraints, this buckle positioning and associated occupant movement is difficult to improve upon. With the seat belt so far out of sight and difficult to reach, many people forget or do not bother to wear them.

In attempts to make restraint systems easier to use (or more difficult not to use), automobile manufacturers have recently developed various alternatives or modifications to the conventional seat belt arrangement. However, none of these newer systems are without drawbacks.

One newer type of "passive" restraint system uses separate lap and shoulder belts. The lap belt is of an earlier conventional design, with a retracting mechanism beside the inboard or outboard side of the seat bottom. The shoulder belt is similar to a conventional shoulder belt with one end attached to the inside of the upper rear corner of the door. In many models, this end is detachable. The other end of the shoulder belt is a separate retracting mechanism beside the inboard side of the seat bottom. When the door is fully open, the belt extends from the inboard side of the seat bottom and up and away from the seat to the outer corner of the door. The vehicle occupant is able to enter the vehicle between the shoulder belt and the seat. When the door is closed, the inboard end of the shoulder belt retracts and the outboard end attached to the door is then in a position above and behind the occupant like a conventional shoulder belt. The occupant then fastens the lap belt in a conventional manner. To exit the vehicle, the occupant unbuckles the lap belt and opens the door, and is able to exit through the door opening.

The above-described passive restraint system has the advantage of automatically fastening and unfastening the shoulder belt when the door is closed or opened, and eliminates the need for the occupant to twist around in the seat to reach for the seat belt. However, the belt extending from the open door limits the room available to enter and exit the vehicle and usually is a hinderance. Passengers find it awkward to enter and exit vehicles having such restraint systems, especially when using them for the first time.

To provide more room to enter and exit a vehicle and to make such actions more natural, another type of restraint system has been developed. Instead of attaching the outboard end of the shoulder belt to the upper rear end of the door, the belt is attached to a movable shuttle riding in a track along the upper periphery of the door opening. When the door is opened, the shuttle automatically moves the outboard end of the shoulder belt forward along the track, and in some cases partially down the 'A' pillar adjacent the side of the windshield. This allows the occupant more room to enter and exit the vehicle without becoming entangled in the shoulder belt. When the occupant is seated and closes the door, the shuttle automatically drives the end of the shoulder belt rearward, and in some instances partially down the 'B' pillar, into an operational position. With this system, the occupant must still manually fasten the lap belt. This system, however, adds more complexity and cost to a vehicle due to the electric motors, drive mechanisms, and controls that are needed for the system to function. The system takes up more space where structural members may be needed. The system also increases the possibility of malfunctions requiring repair or preventing the occupant from being able to use the shoulder belt.

Both of the newer types of restraint systems described above tend to confuse users. Many people feel uncomfortable being automatically strapped in, especially when a shuttle and belt move toward their head unexpectedly. Many occupants bypass the automatic features of these systems by unbuckling the outboard end of the shoulder strap when exiting the vehicle, and buckling it in when they re-enter and close the door. Worse yet, some frustrated occupants dispense from using the restraint belt or belts altogether, and are even tempted to disconnect devices designed to encourage or require the use of seat belts.

Probably the biggest drawback to the "passive" systems is that they still require the occupant to fasten the lap belt him or herself. Many occupants rely on the automatic restraint belt features to strap them in and do not realize that the lap belt has not been fastened for them. Others simply forget to fasten the lap belt, or choose not to do so when traveling short distances. Wearing the shoulder belt without the lap belt can be just as dangerous as wearing no belt at all, and in many circumstances is much more dangerous. Without a lap belt to secure the occupant's waist and lower body in the seat, this portion of the body can fly forward in an accident. This allows the shoulder belt to slip upward on the occupants body. The occupant may slip completely out of the shoulder belt and then be unrestrained, or the shoulder belt may catch under the occupant's chin and cause serious neck injury or decapitation. By automatically securing the shoulder belt while not ensuring that the lap belt is fastened, these newer restraint systems often place a vehicle's occupants in a very dangerous position.

What is needed, and what the prior art lacks, is a simple, inexpensive way of allowing a vehicle's occupants to see and conveniently reach their seat belts so they can fasten them without having to twist around and reach behind them while attempting to locate their seat belts.

SUMMARY OF THE INVENTION

In accordance with one aspect of the present invention, a pivotally mounted armrest is provided that presents a restraint belt buckle to a vehicle's occupant in a convenient position when the armrest is moved from a retracted position to an extended working position.

In a preferred embodiment, the armrest is pivotally mounted to the outboard side of the seat back and is upwardly retractable along side of the seat back to allow easy entry for the vehicle occupant. When the armrest is manually or automatically lowered into a working position parallel to the seat bottom, the distal end of the armrest captures the restraint belt and buckle and presents the buckle to the vehicle occupant in an easy to see and reach position. The occupant is then able to pull the buckle from the distal end of the arm rest and around his or her torso for fastening. When the armrest is raised to an upright position beside the seat back and the belt is unbuckled for occupant egress, the restraint belt and buckle automatically return to a retracted position over the retracted armrest. In this position, the armrest and restraint system are ready for another lowering and buckle presentation and fastening cycle.

In an alternate embodiment, the armrest is downwardly retractable along side the seat back and seat bottom rather than upwardly retractable along side the seat back. In all other respects, this embodiment performs substantially the same as the preferred embodiment.

In accordance with another aspect of the present invention, the pivoting motion of the inventive armrest is controlled automatically. When the door is opened, the armrest is automatically driven upward into an upright and retracted position beside the seat back. When the door is closed and a pressure switch located in the seat bottom detects the presence of an occupant, the armrest is automatically driven downward into a lowered and working position, and the seat belt buckle is presented to the occupant.

Preferably, the inventive armrest is part of a seat having a self-contained restraint system. In such a seat, the belt reel and tensioner unit is located in the seat back to one side of the headrest rather than on the vehicle roof or 'B' pillar. The lower seat belt anchor point (or lower belt reel and tensioner unit, if one is used) is located on the seat frame rather than on the floor. With this configuration, the seat, armrest and restraint system can be manufactured and installed as a single unit, and the restraint belts do not block access to the rear seats. Also, the design of the vehicle is not constrained by restraint system anchor points (such as in convertibles and vans with conventional restraint systems, for example) and these anchor points can be more optimally placed with respect to the occupant, especially when the seat position has a large adjustment range with respect to the vehicle.

Advantages to an outwardly located armrest being attached to the seat, as opposed to being attached to the door, are disclosed in a parent application, Ser. No. 07/912,790, now U.S. Pat. No. 5,378,036, issued Jan. 3, 1995, to John A. Townsend and entitled IMPROVEMENTS IN SLIDING AUTOMOBILE DOOR. These advantages include being able to optimally locate the armrest with respect to the occupant, regardless of the adjustable positioning of the seat. This is important not only when using the armrest to support the occupant's arm, but also when optimally positioning a side air bag, located in the armrest, for deployment during a side impact. The location of the armrest on the outboard side of the seat also has several advantages when used in conjunction with a vertically sliding door, the subject of the parent application.

BRIEF DESCRIPTION OF THE DRAWINGS

FIG. 1A is a side elevational view showing the armrest of the preferred embodiment in the retracted upright position.

FIG. 1B is an enlarged partial view taken within line 1B of FIG. 1A.

FIG. 2A is a side elevational view showing the armrest of the preferred embodiment in the lowered working position with the seat belt buckle being presented to the vehicle's occupant.

FIG. 2B is an enlarged partial view taken within line 2B of FIG. 2A.

FIG. 13 is a side elevational view showing the automatic drive mechanism within the seat.

FIG. 14 is a plan view showing the automatic drive mechanism.

DETAILED DESCRIPTION OF THE PREFERRED EMBODIMENTS

Figure 3:
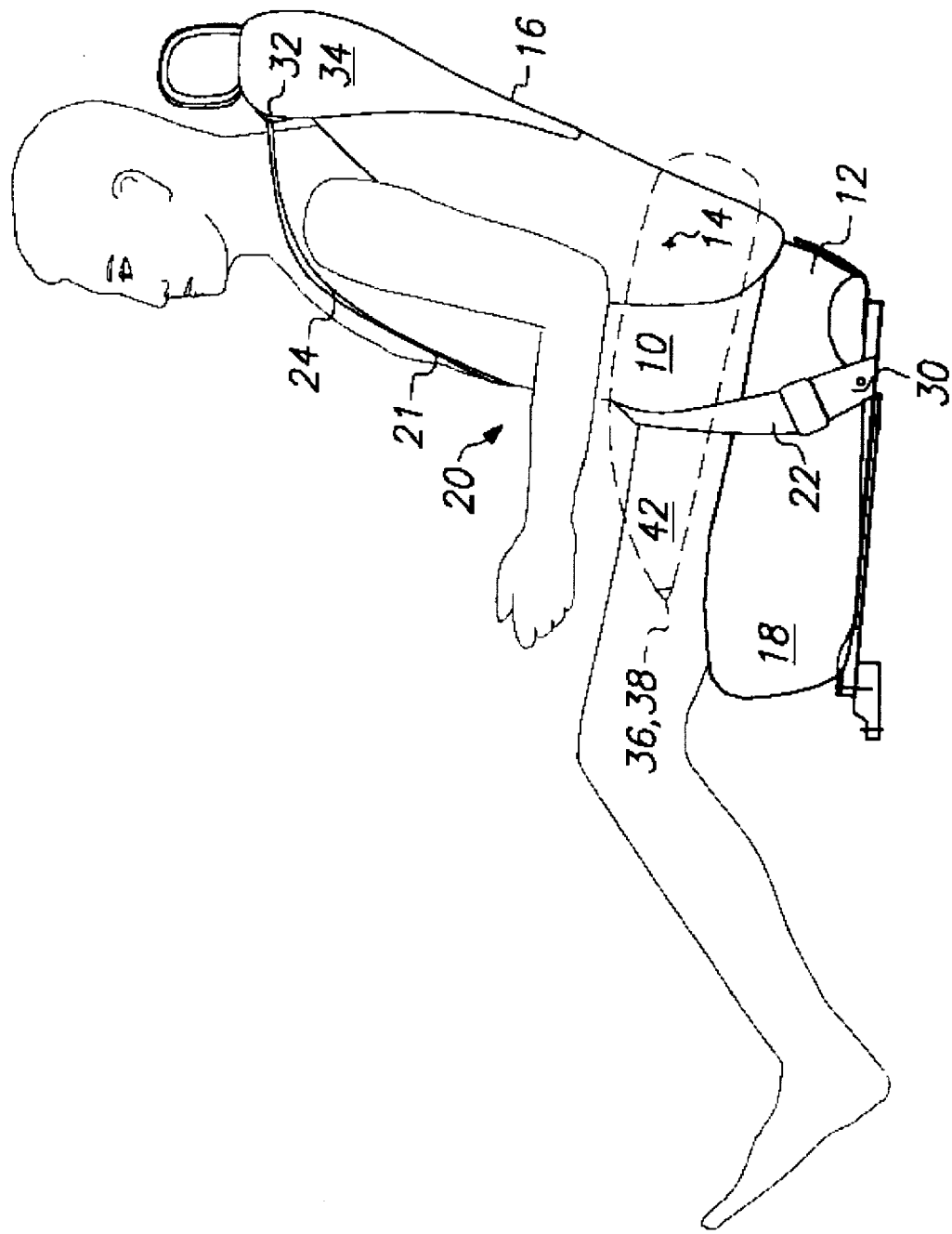
FIG. 3 is a side elevational view showing the armrest of the preferred embodiment in phantom in the lowered working position with the seat belt fastened.

Referring to FIGS. 1A through 6, the preferred embodiment of the inventive armrest 10 is shown in conjunction with a driver's seat 12. Installation of the armrest on a passenger seat would result in mirror-images of these figures. The armrest can also be used in a similar manner with the rear seats of a vehicle.

The armrest 10 is mounted towards the side of the vehicle from which the seat belt or belts are retracted when not in use. This is usually the outboard side, as shown by the preferred embodiment in the figures, but can be the inboard side when the restraint system is integral with the seat as shown. The armrest 10 is pivotally attached to the outboard side of seat 12 at pivot 14. FIGS. 1A and 4A show the armrest 10 in its upright retracted position alongside the seat back 16. FIGS. 2A, 3, 5A and 6 show the armrest 10 in its lowered working position substantially parallel to and above the seat bottom 18.

A conventional lap and shoulder belt restraining arrangement mounted on seat 12 is also shown in the figures. This seat belt system 20 includes a continuous belt 21 having a lap portion 22 and a shoulder portion 24, a single buckle 26 slidably received on the belt 21, a latching mechanism 28, a lap belt anchor 30, and a belt reel and tensioner 32. A buckle stop button 31 is carried by the belt beneath the buckle 26 to maintain the buckle in an elevated condition within reach of the occupant and prevent the buckle from sliding to the lower end of the belt.

Figure 4A:
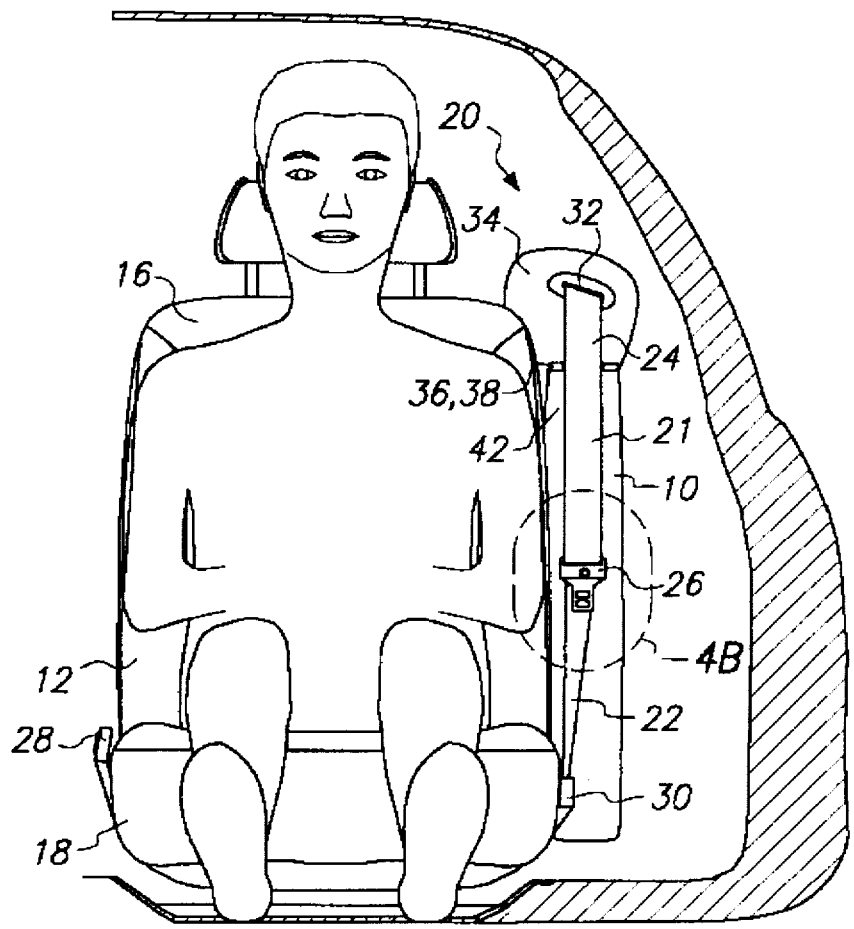
FIG. 4A is a front elevational view showing the armrest of the preferred embodiment in the retracted upright position.
Figure 4B:
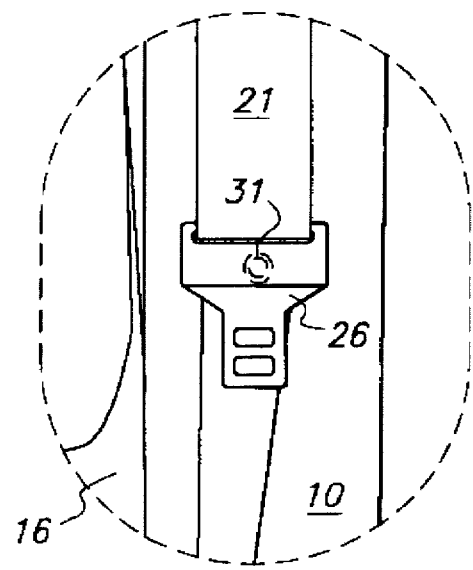
FIG. 4B is an enlarged partial view taken within line 4B of FIG. 4A.
Figure 6:
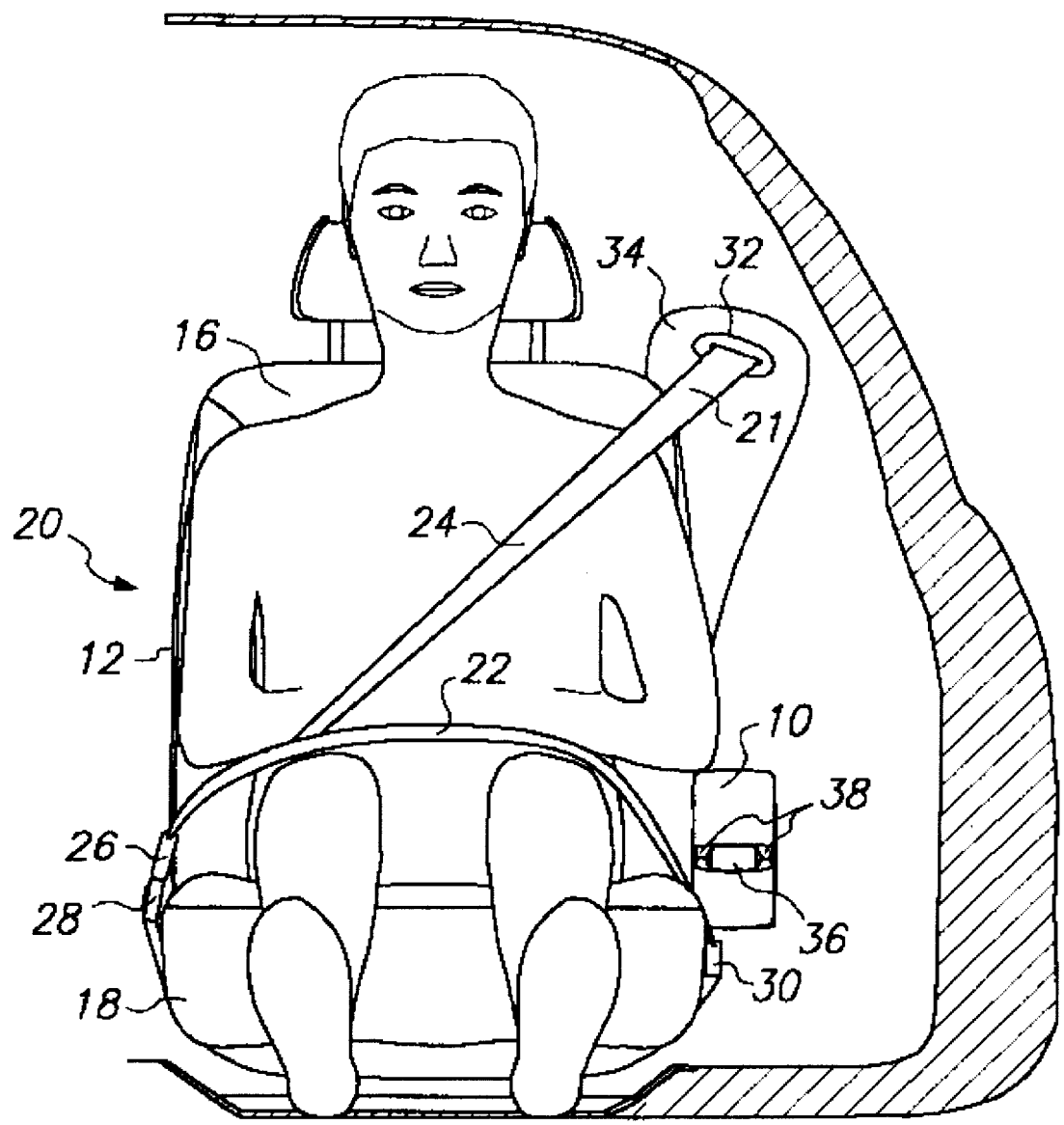
FIG. 6 is a front elevational view showing the armrest of the preferred embodiment in the lowered working position with the seat belt fastened.

FIGS. 3 and 6 show the belt system 20 when fastened. Latching mechanism 28 is secured to the rear inboard side of the seat 12. The latching mechanism 28 releasably retains complementary buckle 26. In use, belt portion 22 extends from buckle 26 over the waist of the occupant to the anchor 30, which is mounted on the rear outboard side of seat 12. Shoulder belt portion 24 extends from buckle 26 diagonally up and across the occupant's torso to the shoulder belt reel and tensioner 32, which is securely mounted to the upper outboard side of seat back 16 inside seat appendage 34.

The shoulder belt reel and tensioner 32 operates in a conventional manner to keep lap belt portion 22 and shoulder belt portion 24 snug against the occupant's body while allowing the occupant some movement. Reel and tensioner 32 locks in the event of a collision to retain the occupant in seat 12. When the seat belt system 20 is not in use, buckle 26 is released from latching mechanism 28, and reel and tensioner 32 draws the lap belt portion 22 and shoulder belt portion 24 together with the buckle 26 towards the outboard side of the vehicle.

Figure 5A:
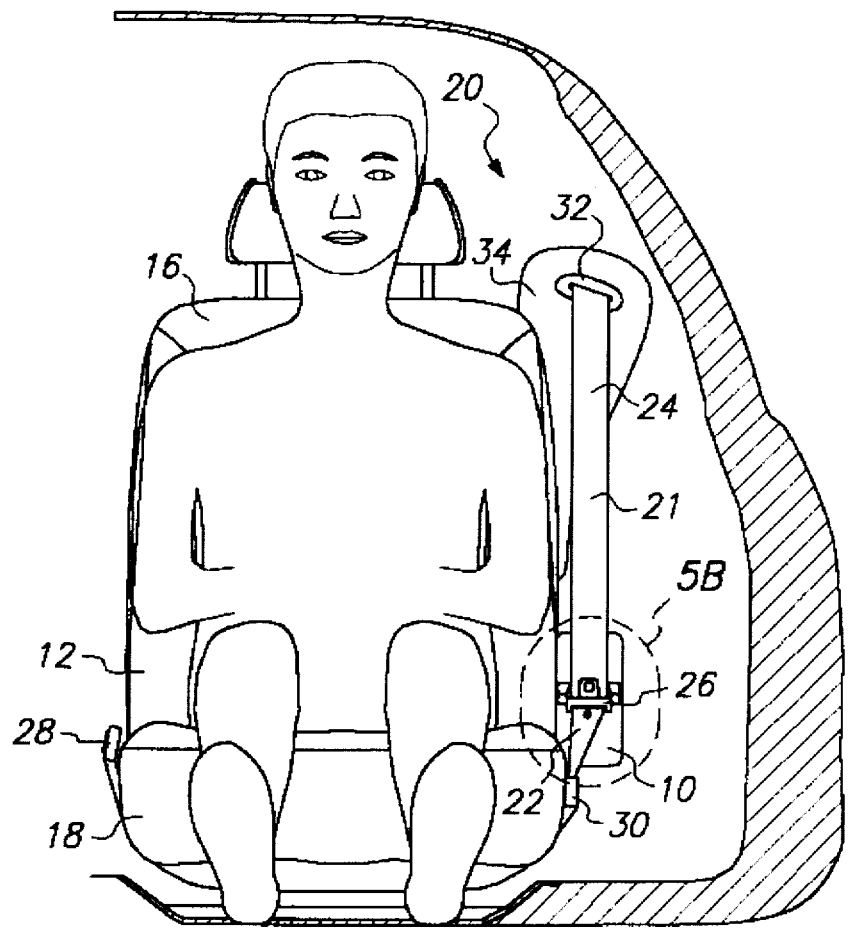
FIG. 5A is a front elevational view showing the armrest of the preferred embodiment in the lowered working position with the seat belt buckle being presented to the vehicle's occupant.
Figure 5B:
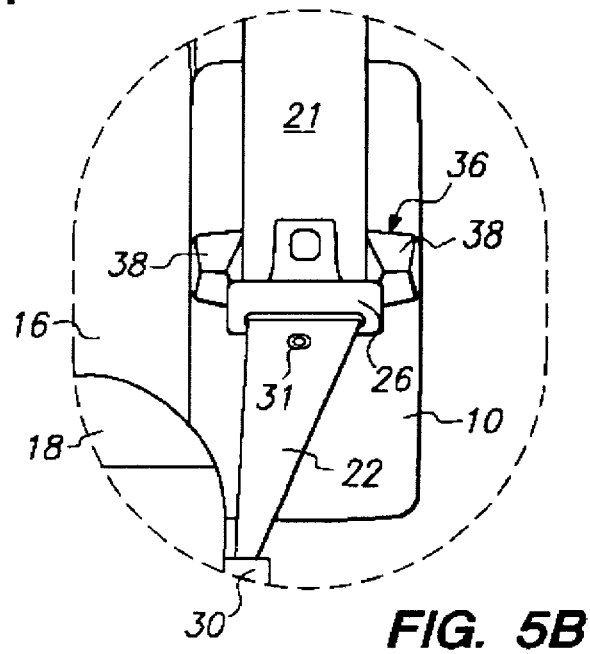
FIG. 5B is an enlarged partial view taken within line 5B of FIG. 5A.

Referring to FIGS. 2B and 5B, a metal or hard plastic belt and buckle guide 36 is formed on the distal end 42 of armrest 10. The belt and buckle guide 36 includes a pair of laterally spaced protrusions 38 for slidably retaining belt 21 therebetween on the distal end 42 of armrest 10.

Referring to FIGS. 1A and 4A, when the restraint system 20 is not in use and the armrest 10 is in the upright position, shoulder belt reel and tensioner 32 draws the belt 21 and buckle 26 upward and coils the excess belt 21 therein. In this retracted position, belt 21 extends from anchor 30 over the length of armrest 10 to reel and tensioner 32. Stop button 31 on belt 21 prevents buckle 26 from sliding down below a predetermined height. When retracted, the restraint system 20 and the armrest 10 do not impede the occupant's ingress to or egress from the vehicle.

To insure reliable operation, it is important that when belt and buckle guide 36 is in the retracted position, it is positioned between belt anchor 30 and reel and tensioner unit 32 so that it may consistently capture belt 21 when armrest 10 is lowered into the working position. To keep belt 21 centered in belt and buckle guide 36, belt and buckle guide 36 preferably travels along an arc that is in the same plane as a line connecting anchor 30 and reel and tensioner unit 32.

Referring to FIGS. 2A and 5A, as the armrest 10 is manually or automatically lowered from the upright position to the lowered working position shown, reel and tensioner unit 32 releases the required amount of belt 21, while keeping tension on the belt. As armrest 10 is extended down into the working position, belt 21 slides upward through belt and buckle guide 36. Buckle 26 is prevented from climbing above guide 36 by protrusions 38 which contact the outer extremities of buckle 26. When armrest 10 reaches the fully lowered working position, belt 21 remains between guide protrusions 38, and buckle 26 is captivated between protrusions 38 and stop button 31. In this position, buckle 26 extends from the distal end 42 of armrest 10 where the occupant is able to clearly see and easily reach the belt buckle 26.

When the occupant is ready to fasten the seat belt 21, he or she can easily grasp the belt buckle 26 (or alternatively a portion of the shoulder belt 24 adjacent to the buckle 26), pull the buckle 26 and belt 21 from the guide 36, and draw it around to the inboard side of the seat 12 for fastening to the latching mechanism 28. As the buckle 26 is drawn around to the inboard side of the occupant, it is able to slide along belt 21. The lap belt portion 22 wraps around the occupant's waist, and the shoulder belt portion 24 wraps diagonally across the occupant's torso.

FIGS. 3 and 6 show the restraint system 20 when fastened. The restraint system 20 and armrest 10 are configured so that when belt 21 is fastened, guide 36 and armrest 10 do not touch any part of the restraint system 21 nor interfere with its operation. In this position, belt system 20 operates as a conventional restraint system, and armrest 10 operates as a conventional armrest.

To exit the vehicle, the armrest 10 is manually or automatically raised and the occupant releases the belt buckle 26 from the latching mechanism 28. This action resets belt 21 over armrest 10 and belt and buckle guide 36, as shown in FIGS. 1A and 4A and described above, and the system is ready for another presentation cycle. Preferably buckle 26 is not released before armrest 10 is raised in this embodiment. Otherwise belt 21 may get caught behind armrest 10 when it is raised rather than getting positioned in belt and buckle guide 36. If this happens, the vehicle occupant would have to manually remove belt 21 from behind armrest 10 or buckle the belt in a conventional manner after armrest 10 is lowered without presenting buckle 26. To avoid this scenario and to further automate egress from the vehicle, a sensor in latching mechanism 28 (not shown, but existing in many vehicles today) can be arranged to trigger the automatic retraction of armrest 10 when buckle 26 is unfastened.

Referring to FIGS. 7A through 12, an alternate embodiment is shown. This alternate embodiment operates in much the same manner as the preferred embodiment described above, except armrest 10' retracts down alongside seat bottom 18 rather than up alongside seat back 16.

Figure 7A:
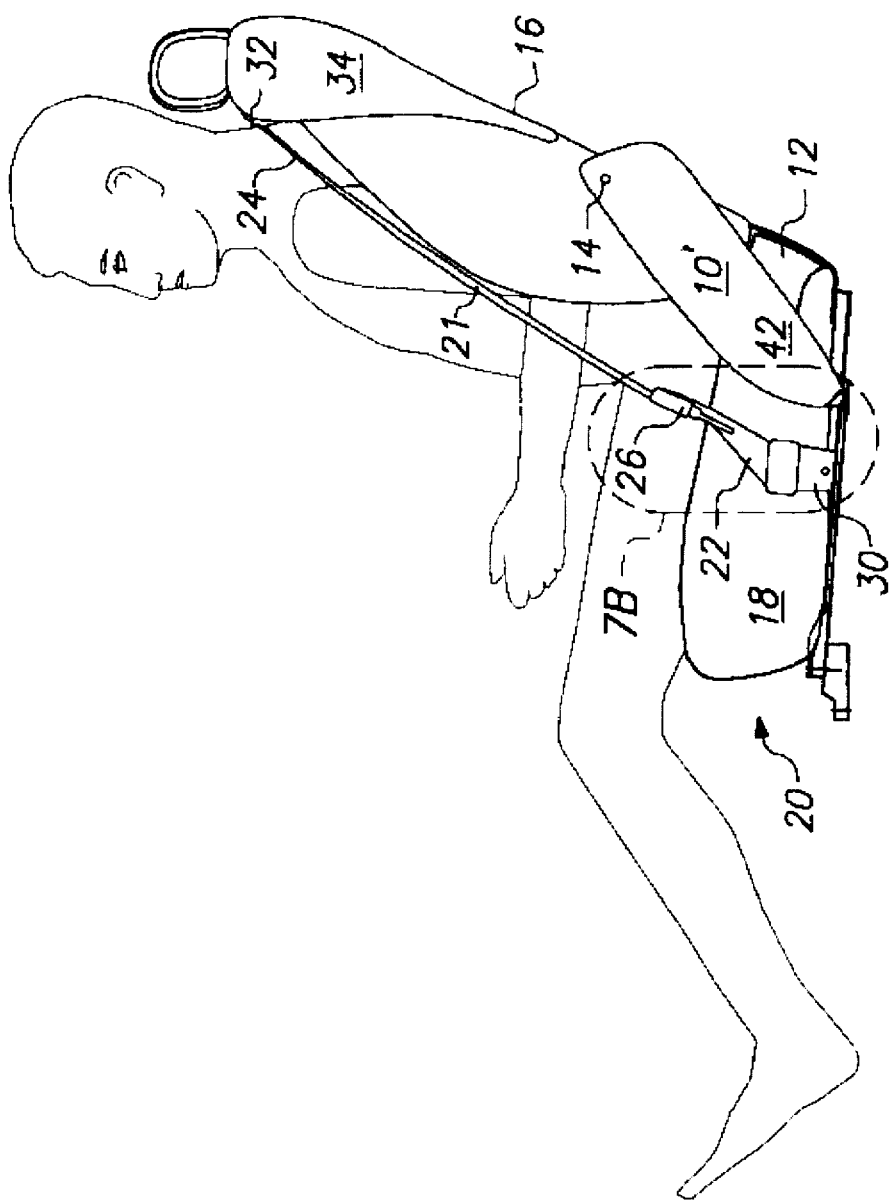
FIG. 7A is a side elevational view showing the armrest of the alternate embodiment lowered into the retracted position.
Figure 7B:
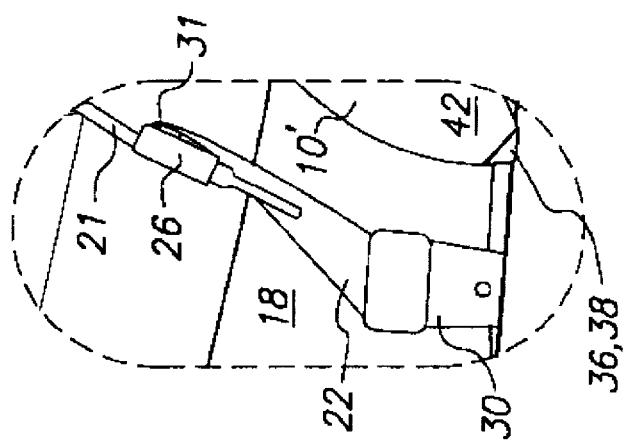
FIG. 7B is an enlarged partial view taken within line 7B of FIG. 7A.
Figure 10A:
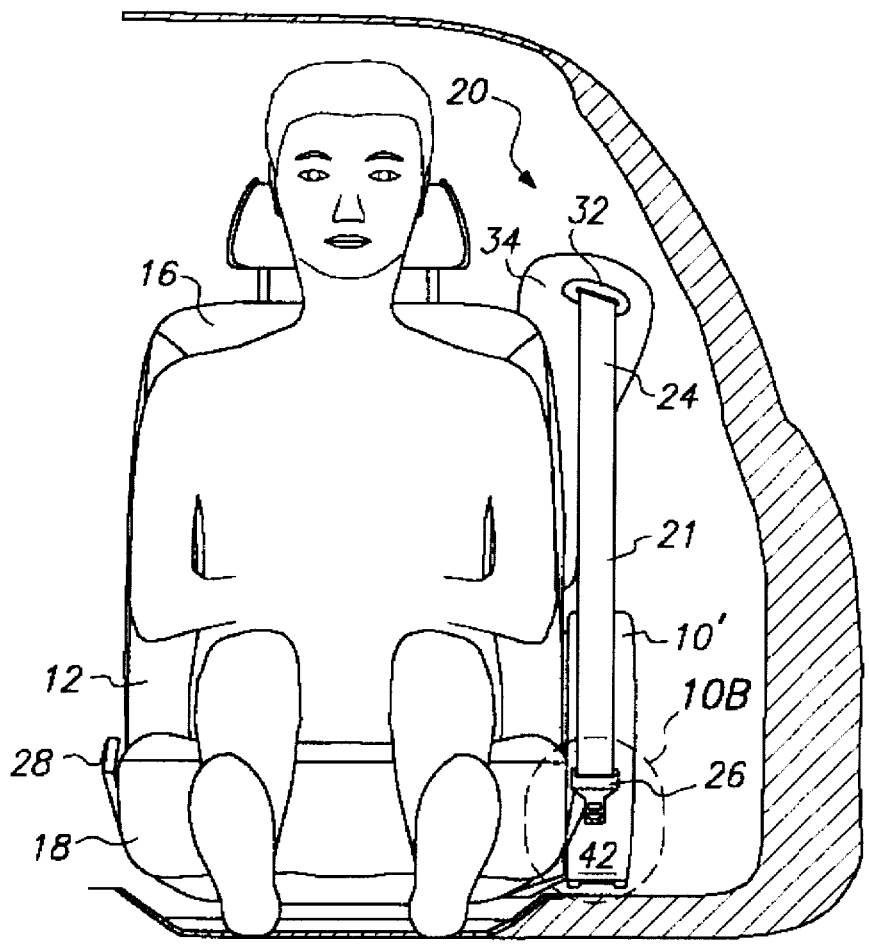
FIG. 10A is a front elevational view showing the armrest of the alternate embodiment lowered into the retracted position.
Figure 10B:
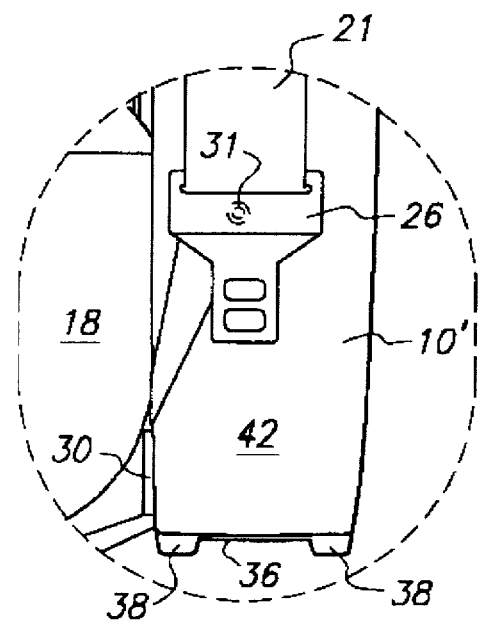
FIG. 10B is an enlarged partial view taken within line 10B of FIG. 10A.

Referring to FIGS. 7A and 10A, armrest 10' of the alternate embodiment is shown in the lowered, retracted position. The lap belt anchor 30 is positioned farther forward than it is in the preferred embodiment, and stop button 31 is located lower on belt 21, allowing buckle 26 to hang lower in the alternate embodiment than in the preferred embodiment.

Figures 8A, 8B:
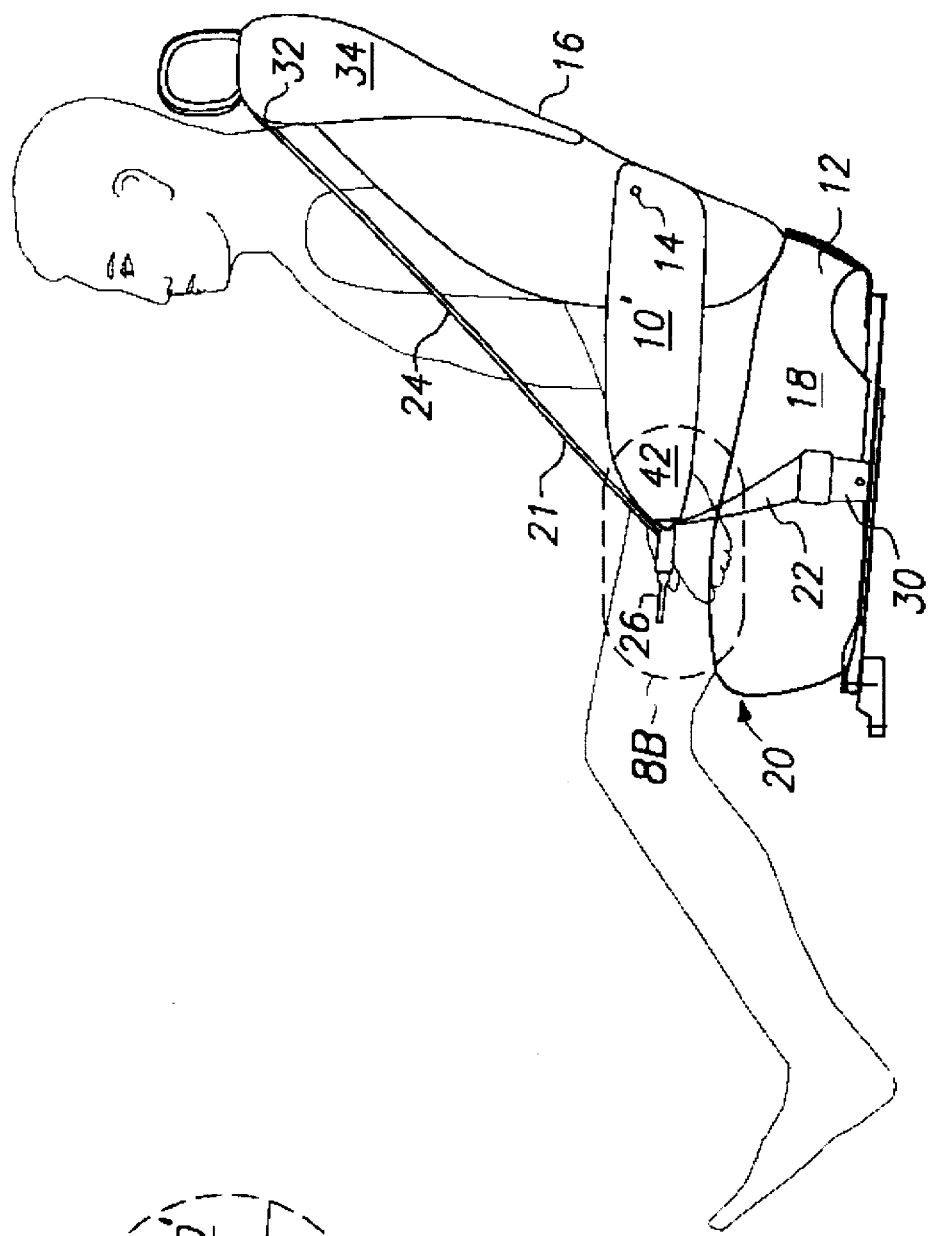
FIG. 8A is a side elevational view showing the armrest of the alternate embodiment raised into the working position with the seat belt buckle being presented to the vehicle's occupant.
FIG. 8B is an enlarged partial view taken within line 8B of FIG. 8A.
Figure 11A:
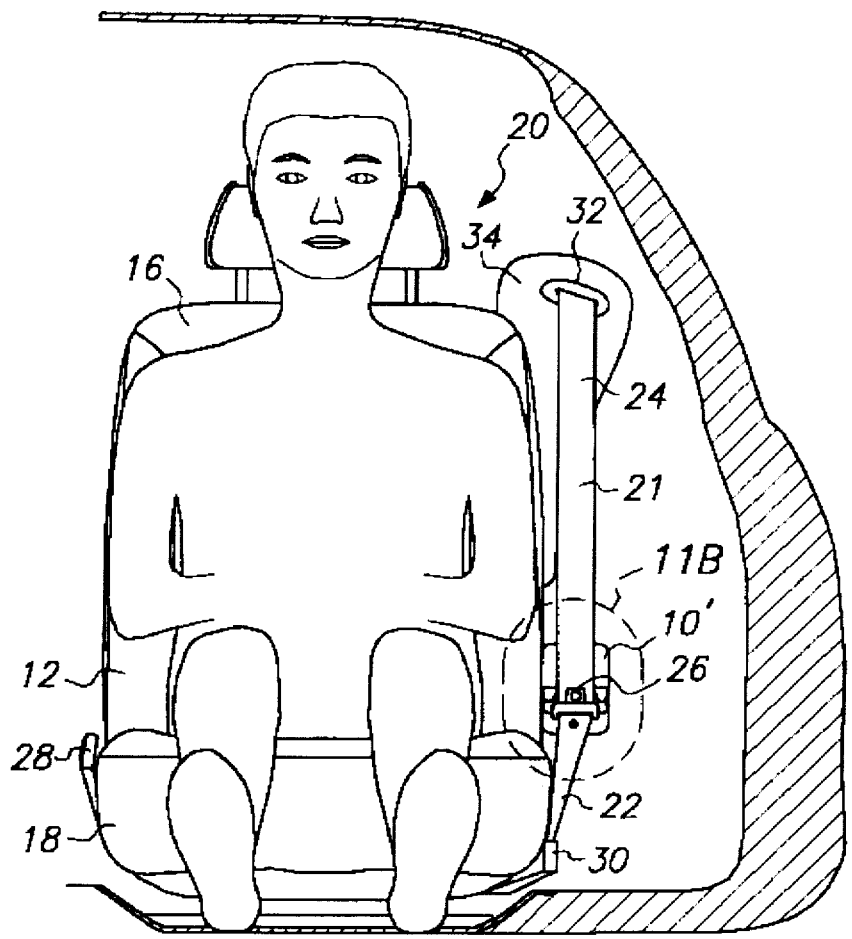
FIG. 11A is a front elevational view showing the armrest of the alternate embodiment raised into the working position with the seat belt buckle being presented to the vehicle's occupant.
Figure 11B:
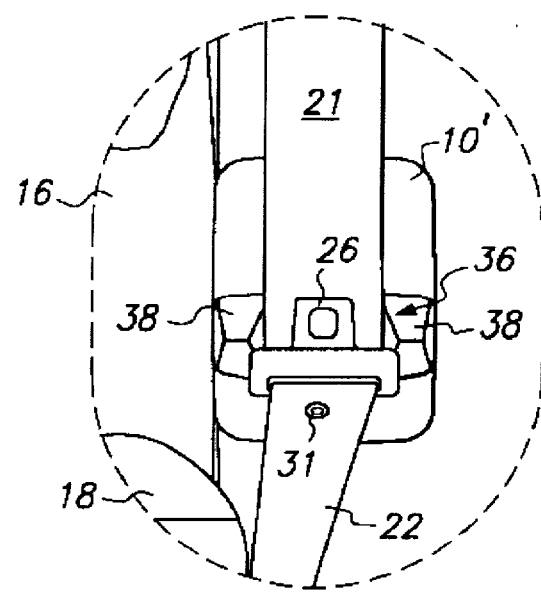
FIG. 11B is an enlarged partial view taken within line 11B of FIG. 11A.

Referring to FIGS. 8A and 11A, armrest 10' is shown in the raised, working position. As armrest 10' raises from the retracted position into the working position, protrusions 38 of belt and buckle guide 36 engage buckle 26 and lift it up into a position where it is presented at the distal end 42 of armrest 10' to the vehicle occupant.

Figure 9:
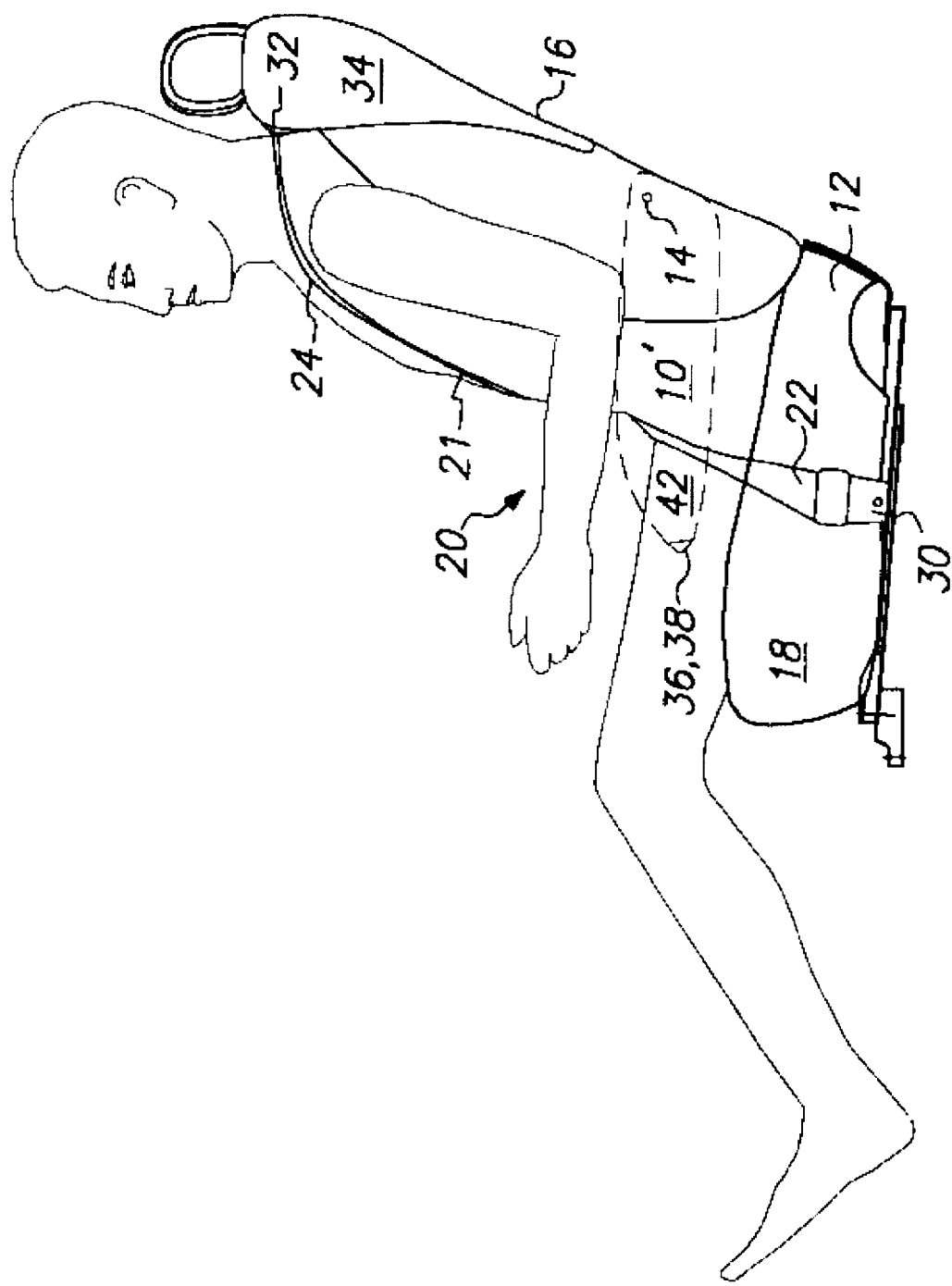
FIG. 9 is a side elevational view showing the armrest of the alternate embodiment in phantom in the working position with the seat belt fastened.
Figure 12:
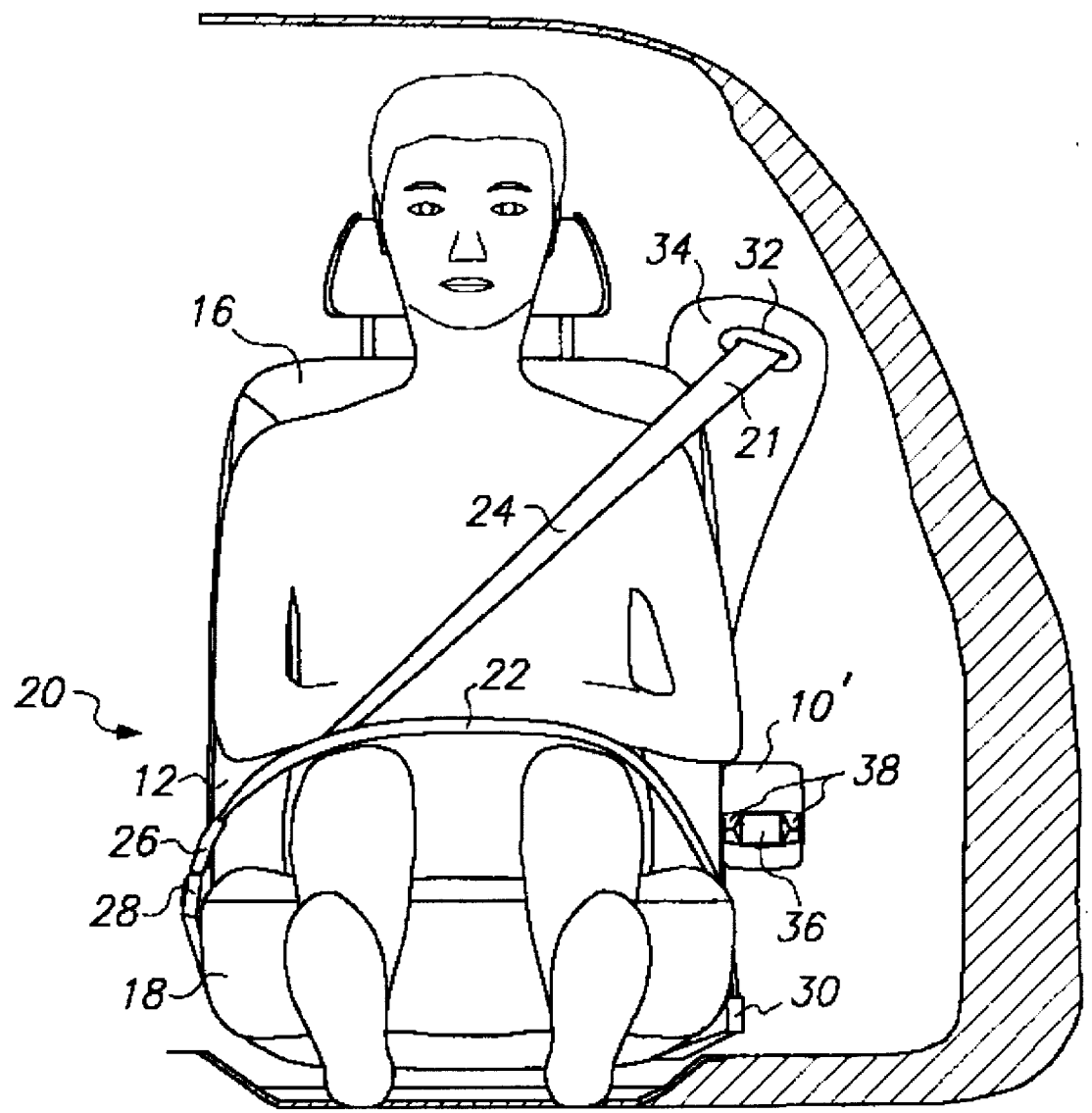
FIG. 12 is a front elevational view showing the armrest of the alternate embodiment in the working position with the seat belt fastened.

Referring to FIGS. 9 and 12, armrest 10' is shown in the raised, working position, and restraint system 20 is shown fastened around the occupant. The occupant may release buckle 26 before or after armrest 10' is raised, as belt 21 can not get caught underneath armrest 10' when it is retracting in this embodiment.

Referring to FIG. 13, the armrest of the preferred embodiment moves about 100 degrees between the upright retracted position and the lowered working position, as depicted by arrow 'A'. This motion, in either the preferred or alternate embodiment, can be accomplished manually by the occupant, or automatically by an armrest drive mechanism 44, shown in FIG. 14. Automatic armrest operation allows the seat belt to be automatically presented to the occupant and requires less effort when entering or exiting the vehicle. An electric motor 46 and gearbox 48 can be located in the seat back 16 at pivot point 14. The gearbox 48 drives a safety clutch 50 which in turn rotates an armrest driver 54, driving armrest 10 up or down. Safety clutch 50 has a spring loaded detent 52 within it so that if an outside pressure is exerted to the armrest 10 while the electric motor 46 is activated, the armrest 10 will remain in its present position as long as the force is applied. This means that if an arm or some other object is in the path of armrest 10 as it moves to or from its upright position, armrest 10 will stop its movement until the object has been removed. Safety clutch 50 also allows the armrest 10 to be lifted or lowered manually in the event of a power failure.

The orientation of the above drive arrangement could be reversed so that motor 46 and gearbox 48 are located within the armrest 10 and clutch 50 connects to the seat back 16. Alternately, the motor 46 and gearbox 48, or some other drive means, can be located elsewhere and connected to the armrest 10 through a cable arrangement or some other suitable mechanism.

Figure 15:
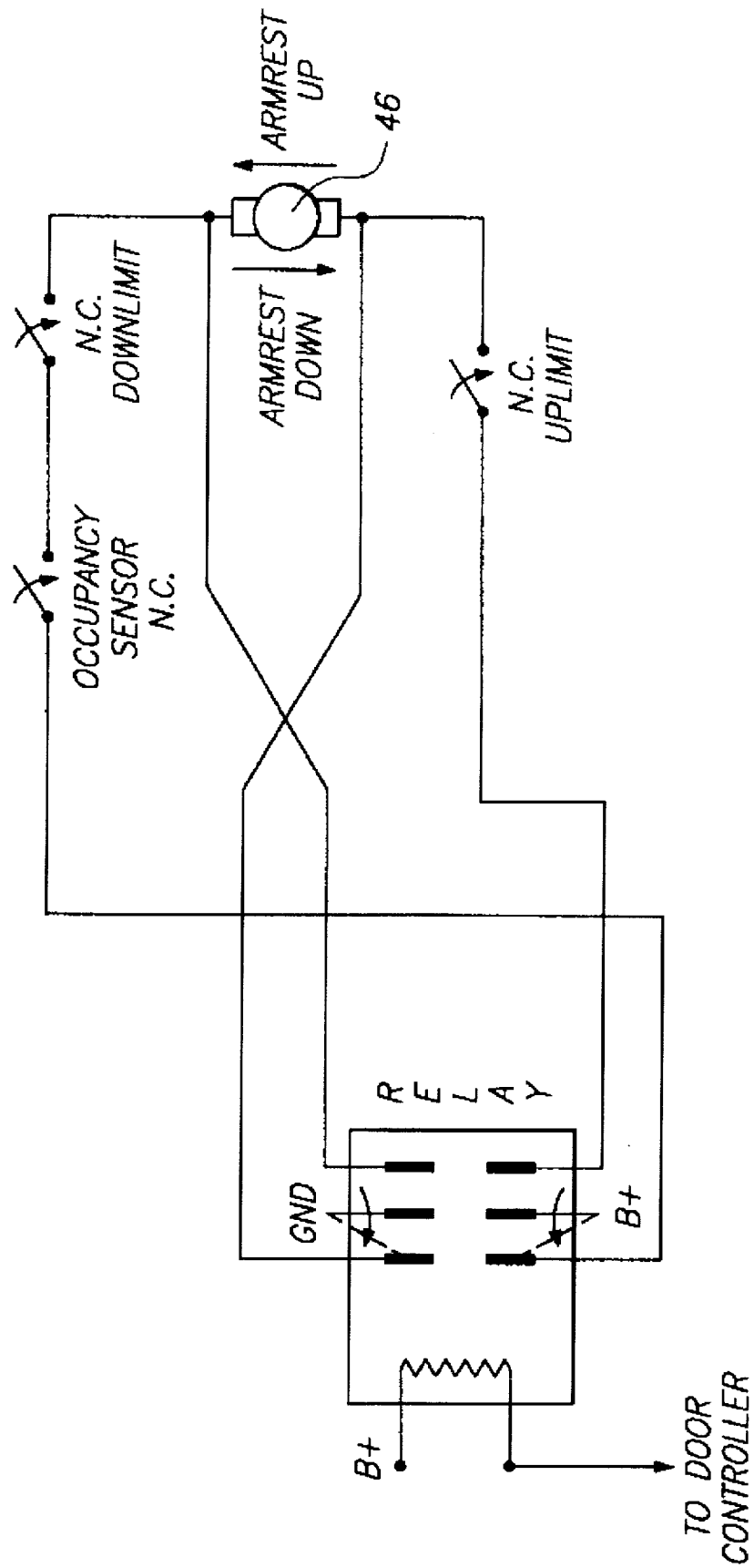
FIG. 15 is an electrical schematic of the control circuit for an automatic drive mechanism.

Referring to FIG. 15, the preferred control circuit for an upwardly retracting armrest is shown. The operation of armrest motor 46 is preferably triggered by a door controller which operates the vehicle's vertically sliding doors, which are the subject of the parent U.S. Pat. No. 5,378,036. A normally closed pressure switch located in the seat cushion is depressed by a vehicle occupant as he or she sits down on the seat. As the door closes, the door controller supplies current to energize an armrest relay. If an occupant is sitting in the seat, the relay provides current to reversible armrest motor 46 to lower armrest 10 until a normally closed down limit switch senses that the armrest has reached the lowered working position. In this way, the armrest is lowered and the belt buckle is presented to the occupant as described above when the door is closed.

Unlatching the belt buckle in order to exit the vehicle signals the door controller to cut off power to the armrest relay. When the armrest relay is de-energized, current is provided in the opposite direction to reversible armrest motor 46. Motor 46 drives the armrest upward until a normally closed up limit switch senses that the armrest has reached a fully upright, retracted position.

Preferably, the front and rear armrests on each side of the vehicle are wired in parallel. The same door controller signal activates both armrests, dependant on the occupancy of the seats.

As described above, it is preferable that the seat belt restraint system, armrest and even side impact air bag are completely integrated into the seat as a single unit. This allows the automobile manufacturer to quickly install the seat/restraint unit at any one of a number of points along an assembly line, without having to coordinate the seat installation with upper and lower belt anchor points, belt retracting mechanisms, head liner, carpeting, trim pieces, etc., or have a restraint belt in the way of installing the seats or other items in the vehicle body. The restraint systems and armrests can more easily be installed in a complete seat assembly outside the vehicle, rather than inside a vehicle body traveling down an assembly line. With this type of configuration, the location of the armrest, seat belts and air bags can be optimally maintained with respect to the passenger, even after the seat position is adjusted.

If the present invention is not used with a restraint system that is integrated into the seat, stationary belt guides (not shown) may have to be incorporated into the top and or bottom of the seat to guide the belt into a position where it can be engaged by the belt and buckle guide 36 as the armrest 10 is extended into the working position.

In alternate embodiments (not shown), the belt and buckle guide 36 could be replaced by other suitable buckle retaining means, such as a magnet (permanent or alternately powered electromagnet) located at the distal end 42 of armrest 10.

Of course, the present invention can also be configured so that the locations of the buckle 26 and the mating latching mechanism 28 are swapped. The latching mechanism would then be slidably attached to belt 21 and the buckle 26 located on the inboard side of the seat 12. Belt and buckle guide 36 would then hold the latching mechanism 28, rather than the buckle 26.

The present invention can also be utilized with restraint systems that do not use belt buckles (not shown). The armrest and restraint system would be configured in the same way as described above, but belt 21 would not include buckle 26 or stop button 31. As armrest 10 is extended into the working position, only belt 21 would be captured by guide 36 and presented to the occupant. The occupant would grab the belt directly and pull it across his or her body for engagement with a latching mechanism designed to engage the belt directly without any buckle.

The above descriptions and drawings are for illustrative purposes only, and are not exhaustive of possible alternate embodiments of the invention. It is to be understood that the present invention is not limited to the sole embodiments described above and illustrated herein, but encompasses any and all variations falling within the scope of the appended claims.

What is claimed as the invention is:

1. A restraint system presentation apparatus for presenting a restraint belt to a vehicle occupant, the apparatus comprising:

an armrest retractable to a withdrawn position and extendable to a working position; and belt guide means located on a distal end of the armrest for releasably retaining the belt on the distal end of the armrest as the armrest is extended, the guide means presenting the belt in a position conveniently accessible to the occupant when the armrest is in the working position, the guide means allowing the occupant to release the belt therefrom and operate the restraint system.

2. A restraint system presentation apparatus for presenting a restraint belt buckle to a vehicle occupant, the apparatus comprising:

an armrest retractable to a withdrawn position and extendable to a working position; and belt and buckle guide means located on a distal end of the armrest for releasably retaining the belt on the distal end of the armrest as the armrest is extended, and for releasably retaining a belt buckle in a position conveniently accessible to the occupant when the armrest is in the working position, the guide means allowing the occupant to release the belt buckle therefrom and operate the restraint system.

3. A restraint system presentation apparatus as claimed in claim 1 or 2 wherein the armrest has a proximal end and a distal end, the armrest being pivotally attached at its proximal end to a seat and movable therewith.

4. A restraint system presentation apparatus as claimed in claim 2 wherein the armrest includes a driver means for automatically moving the armrest into the working position to present the belt buckle to the occupant when a vehicle door is first closed, and for automatically retracting the armrest into the withdrawn position when the restraint system is unfastened.

5. A restraint system presentation apparatus as claimed in claim 4 wherein the driver means does not move the armrest into the working position unless a pressure sensor located in a seat detects the presence of an occupant in the seat.

6. A restraint system presentation apparatus as claimed in claim 3 wherein the armrest is pivotally attached to a seat back portion of the seat, the armrest is located adjacent to a seat back portion of the seat when retracted in the withdrawn position, and the armrest is located substantially above and parallel to the seat bottom portion when extended in the working position.

7. A restraint system presentation apparatus as claimed in claim 3 wherein the armrest is pivotally attached to a seat back portion of the seat, the distal end of the armrest is located adjacent to a seat bottom portion of the seat when retracted in the withdrawn position, and the armrest is located substantially above and parallel to the seat bottom portion when extended in the working position.

8. A restraint system presentation apparatus as claimed in claim 2 wherein the belt and buckle guide means comprises two laterally spaced protrusions for guiding the belt therebetween extending longitudinally outward from the distal end of the armrest.

9. A restraint system presentation apparatus as claimed in claim 8 wherein the two protrusions contact the belt buckle and prevent it from sliding on the belt beyond the distal end of the armrest.

10. A restraint system presentation apparatus as claimed in claim 2 wherein the belt and buckle guide means contacts the buckle and traps it against a stop button located on the belt when the armrest is extended in the working position, thereby presenting the buckle to a vehicle occupant by urging the buckle outward from the distal end of the armrest.

11. A restraint system presentation apparatus as claimed in claim 1 wherein the restraint system includes upper and lower anchor points with the belt extending therebetween when not in use, further wherein the guide means first contacts the belt at a location directly between the upper and lower anchor points as the armrest is extended from the withdrawn position toward the working position.

12. A restraint system presentation apparatus as claimed in claim 1 wherein the restraint system includes upper and lower anchor points with the belt extending therebetween when not in use, further wherein a path followed by the guide means as the armrest is extended from the withdrawn position toward the working position lies in a common plane with the upper and lower anchor points.

13. An restraint system integrated within a vehicle seat comprising:

a seat bottom;

an upwardly disposed seat back attached to the seat bottom;

a seat belt anchored at one end to a structural portion of the seat bottom and retained at an opposite end of the belt to an upper portion of the seat back by a reel and tensioner unit, the seat belt extending generally vertically along one side of the seat when not in use;

a seat belt buckle slidably retained on the seat belt;

a retractable armrest pivotally attached to a side of the seat back generally below the reel and tensioner unit, the armrest retractable to a withdrawn position and extendable to a working position; and a belt and buckle guide including two laterally spaced protrusions located on a distal end of the armrest for releasably retaining the belt as the armrest is extended from the withdrawn position to the working position, the guide serving to releasably present the belt buckle to a vehicle occupant at the distal end of the armrest when the armrest is in the working position.

* * * * *

UNITED STATES PATENT AND TRADEMARK OFFICE
CERTIFICATE OF CORRECTION

PATENT NO. : 5,538,283
DATED : July 23, 1996
INVENTOR(S) : John A. Townsend

It is certified that error appears in the above-indentified patent and that said Letters Patent is hereby corrected as shown below:

Title page, item [54], delete "RESTAINT" and insert--RESTRAINT--.
Column 1, line 2, "RESTAINT" and insert -- RESTRAINT--.

Signed and Sealed this

Fourteenth Day of January, 1997

Attest:

BRUCE LEHMAN

*Attesting Officer*    *Commissioner of Patents and Trademarks*

UNITED STATES PATENT AND TRADEMARK OFFICE
CERTIFICATE OF CORRECTION

PATENT NO. : 5,538,283
DATED : July 23, 1996
INVENTOR(S) : John A. Townsend It is certified that error appears in the above-identified patent and that said Letters Patent is hereby corrected as shown below:

In Col. 2, line 38, delete "hinderance" and insert --hindrance--;

In Col. 8, line 39, delete "dependant" and insert --dependent--.

Signed and Sealed this

Twenty-fifth Day of March, 1997

*Attest:*

BRUCE LEHMAN

*Attesting Officer*  Commissioner of Patents and Trademarks